3,079,291
Patented Feb. 26, 1963

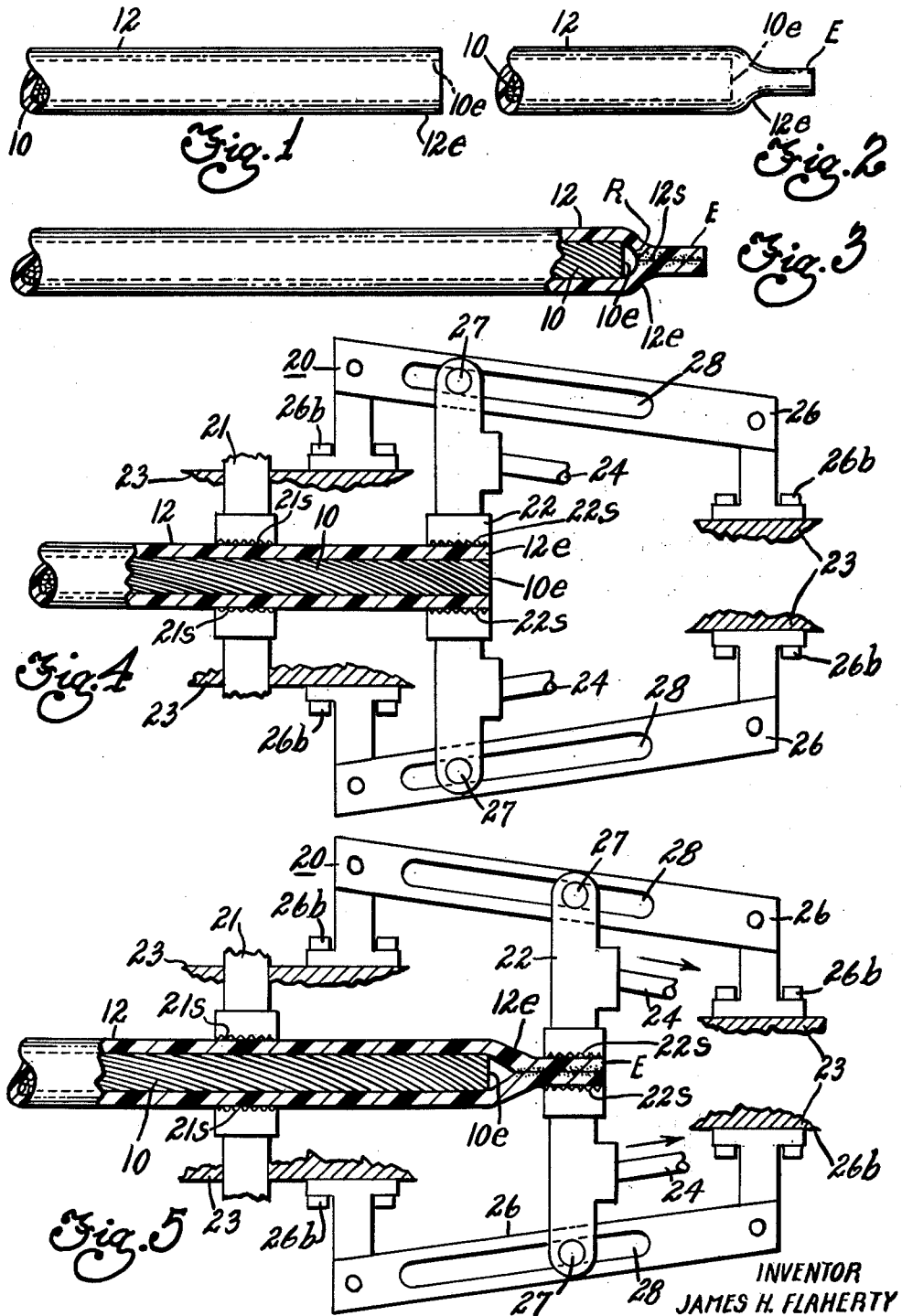

3,079,291
APPARATUS AND METHOD FOR CAPPING WIRE
James H. Flaherty, Milwaukee, Wis., assignor to General Motors Corporation, Detroit, Mich., a corporation of Delaware
Filed Oct. 14, 1959, Ser. No. 846,406
4 Claims. (Cl. 156—51)

This invention relates to a method and means for sealing ends of wire, and, particularly, to an electrical and/or hermetic seal thereof involving only insulating material extending longitudinally of the wire.

An object of this invention is to provide a new and improved method and means for sealing ends of insulated conductors by an easily automated operation free of end caps that can be lost, free of messy and molten dip-sealing solutions and involving less time, fewer parts, less overall weight as well as less space and a minimum of cost.

Another object of this invention is to provide a method for sealing ends of wire including an insulating cover thereover and including the steps of providing an insulating housing of thermoplastic or thermosetting composition as a cover extending longitudinally and externally relative to the wire which terminates at an end originally open and exposed because of termination of the cover immediately adjacent thereto, pulling the insulation cover longitudinally over the end of the wire such that an end portion of the cover composition projects longitudinally and radially inwardly relative to the end of the wire, and instantaneously heat sealing and fusing the end portion of the cover composition together to cap the end of the wire.

Another object of this invention is to provide a method and means for sealing ends of wire to be left as non-connected though insulated spare circuitry conductors projecting from a terminal board of electrical devices such as computers and appliances including electric ranges and the like where extra conductors or leads can be provided for future circuitry connections by exposure of a neatly sealed conductor end relative to which an end portion of an insulating cover of the wire is pulled axially beyond a severed end of the conductor and is heat crimped into a position wherein all insulating material of the cover is located radially inwardly relative to an outer periphery of the cover and longitudinally relative to the severed end of the wire.

Another object of this invention is to provide a conductor end cap structure free of separate capping and/or dipping material and including only a severed end of a conductor and an axial extension or a longitudinally projecting end portion of an insulating material covering over the wire, the end portion having a position located axially as well as longitudinally and radially inwardly relative to the severed conductor such that heat applied locally to said end portion effects fusing of insulating material into a completely integral and unseparable cap of the same insulating material.

A further object of this invention is to provide a mechanism for effecting wire end capping and including a first gripping means for holding a conductor and an insulating cover thereof in a fixed position relative to a second gripping means movable relative to the conductor in both longitudinal and radially inward directions relative to the conductor as well as a guide portion or cam means of the mechanism such that the insulating covering alone is drawn longitudinally over a severed end of the conductor and is fused into a sealed integral end over the end of the conductor followed by release and removal of the first and second gripping means of a mechanism relative to the insulated conductor and end.

Further objects and advantages of the present invention will be apparent from the following description, reference being had to the accompanying drawings wherein preferred embodiments of the present invention are clearly shown.

In the drawings:

FIG. 1 shows an insulated conductor having a severed end open and unsealed.

FIG. 2 is a side view of the conductor having a sealed end portion in accordance with the present invention.

FIG. 3 is a fragmentary cross-sectional elevational view of the conductor and sealed end portion in accordance with the present invention.

FIG. 4 is a fragmentary cross-sectional elevational view of a mechanism and severed insulating conductor positioned prior to capping and sealing in accordance with the method of the present invention.

FIG. 5 is a fragmentary cross-sectional elevational view of the mechanism and conductor after operation in accordance with the method of the present invention for capping and sealing an end portion of the insulated conductor.

In FIG. 1 there is shown a conductor or wire 10 provided with an insulating covering 12 that extends longitudinally relative to the conductor. An end portion 12e of the insulating material is located adjacent to a severed end 10e of the conductor. In some installations of electrical devices such as electronic computers and appliances including electric ranges and the like, it is sometimes necessary to provide spare conductors which have a covering of insulating material and which are provided for possible future use in circuits originally not provided in the electrical device. In such installations, it is often necessary to provide a predetermined length of insulated conductor attached to a terminal of a terminal board where space is at a premium though an effective electrical and also generally a hermetic seal is required. Presently, a severed end of an insulated conductor is terminated by a separate insulated cap which can be forced or press fitted onto an end of the conductor. However, these caps can be easily lost especially where movement or vibration is likely to occur in the environment of the installation. Also the separate caps require considerable space and result in added cost of supplying and fitting a separate part. It is also present practice to dip a severed end of a conductor having an insulating covering in a suitable sealing material or solution but such practice results in a messy and often inadequate sealing of the severed end.

In accordance with the present invention, the covering 12 of insulating material is longitudinally and axially stretchable relative to the severed end 10e of the conductor so as to form a termination or conductor end cap structure wherein end portion 12e of the insulating covering is pulled over the severed end 10e into a location where pressure and/or heat fusion of an end section E of the end portion 12e occurs in accordance with the present invention. FIGURE 3 is a fragmentary cross-sectional elevational view of the structure of FIG. 2. FIGURE 3 illustrates how a bond of internal surface 12s of the insulating covering 12 occurs along the section E of the end portion 12e. The end portion 12e also includes a radially inwardly extending section R located axially and longitudinally to one side of the severed end 10e of the conductor.

FIGURE 4 shows a mechanism generally indicated by numeral 20 and having a first gripping means 21 and a second gripping means 22 adapted to engage an outer peripheral surface of the insulating covering 12 at predetermined locations spaced longitudinally from each other. The first gripping means 21 is movable radially inwardly relative to the conductor 10 and firmly engages both the insulating covering 12 and the conductor 10. The first gripping means 21 includes top and bottom jaws which can be moved by a suitable fluid or mechanical actuator (not shown) on a base 23 of the mechanism. Thus the jaws of the first gripping means 21 are movable relative to the first point of engagement relative to the insulated conductor at a location which is a predetermined distance away from the severed end 10e of the conductor. A guide means or pair of cam portions 26 can be suitably attached to the base 23 by means of bolts 26b whereby the second gripping means 22 having a pair of jaws can be positioned so as to engage an outer periphery of the end portion 12e of the insulating covering 12. Each guide means can be articulated into three portions by a suitable pair of pivot means such as pins as outlined in FIGURES 4 and 5 to show that the clamping action of each guide means 26 can be programmed to cause the jaws to close at predetermined points. Pulling means or rods 24 are connected to each of the jaws of the second gripping means 22 such that dowels or pins 27 can be pulled along a guide track or slot 28 of each of the guide portions 26. These tracks 28 extend longitudinally and radially inwardly toward the axis of the conductor 10 such that the jaws of the second gripping means 22 can be moved axially and longitudinally as well as radially inwardly relative to the conductor 10 as the pulling means 24 effect movement of the jaws to the right as shown in FIG. 4.

FIGURE 5 illustrates the result of movement of the second gripping means 22 to the right whereby closure and sealing along section E occurs in accordance with the present invention. The first gripping means is preferably provided with a plurality of serrations 21s for engaging the insulating covering and conductor and the second gripping means 22 has serrations 22s adapted to engage and transmit pulling force relative to only the insulated covering material over the conductor. Preferably the jaws of the second gripping means 22 effect heat sealing of the section E and power for such heat sealing can be transmitted through the pulling means 24. The heat required can be metered out by an electronic or mechanical means as a short duration (controllable) "jolt." It is to be understood that a suitable resistance-element heating unit can be provided adjacent to the serrations 22s inside the jaws of the second gripping means or pressure sealing alone of the section E can be accomplished by exertion of sufficient force upon the insulating covering in the end portion 12e such that a fusion of the insulating material occurs for sealing the conductor end without requiring a separate cap or separate sealing solution presently known to be used. It is to be noted that the first gripping means engages the conductor and insulating cover with sufficient force to prevent movement of the cover relative to the conductor 10 along locations to the left of the first gripping means 21 as shown in FIGS. 4 and 5. However, the covering of insulating material is sufficiently stretchable and movable longitudinally relative to the severed end 10e of the conductor such that capping of the wire end can be accomplished in accordance with the method of the present invention. In accordance with the present invention, the diameter of a cross-section of covering 12 is reduced at a location axially and laterally adjacent to severed end 10e as the sleeving insulation over the conductor is pulled axially beyond the severed end of the conductor and is heat crimped into a position located axially and longitudinally away from the severed end. The advantages of the present invention are many. There is a saving of space occupied by separate insulating caps. No separate sealing solution or materials are required which would result in added cost and loss of neatness in appearance. Furthermore since there is no extra sealing solution or separate insulating cap, there is less weight in the end structure and caps can not be lost such that a fouling of operation could occur particularly such as would result when a cap falls into moving parts. A quick application of the termination can be accomplished using mechanism which can be operated easily under fluid or mechanical power. Wire ends can be easily marked simultaneously in the sealing operation such as by the serrations of the jaws of the gripping means so as to indicate that the end is sealed. There is a saving in the cost and handling of separate materials and cap parts. Preferably the insulating covering is made of a thermoplastic material such as vinylchloride and vinyl-acetate copolymers which are commercially available. A tough thermoplastic material or copolymer having 3% or less of vinyl acetate and 97% or more of vinyl chloride can be used with advantage. It is also possible to use a vinylidene chloride polymer known as "Saran." Saran is a fiber-forming substance of any long chain synthetic polymer composed of at least 80% by weight of vinylidene chloride units. Nylon can also be used and is identified as a fiber-forming substance of any long chain synthetic polyamide having recurring amide groups as an integral part of the polymer chain. It would also be possible to use acrylic resin materials which are a fiber-forming substance having any long chain synthetic polymer composed of at least 85% by weight of acrylonitrile units. Also a new thermoplastic material such as "Delrin" can be used. Delrin is a trade name for a polymer material of repeating —$CH_2O$— groups. This Delrin acetal resin provides properties of high strength, excellent flexural modulus and fatigue life, outstanding resilience and toughness. This acetal resin at room temperature has an elongation of 16% and a tensile strength of 10,000 p.s.i. with no true yield point. At higher temperatures, particularly around 212° F. there is a well defined yield point and considerable elongation, 350° to 500°. Increasing temperature results in decrease in tensile strength and increase in elongation for thermoplastic materials such as superpolyoxymethylene; however, it does retain much of its tensile strength at 250° F. Moisture has almost no effect on tensile properties (less than 10%). It is to be understood that other suitable thermoplastic materials can be used as a covering for the conductor or wire.

While the embodiment of the present invention as herein disclosed constitutes a preferred form, it is to be understood that other forms might be adopted.

What is claimed is as follows:

1. A method for sealing a severed end of a conductor, the steps specifically to comprise, providing a longitudinally-extending insulating covering of heat-fusible plastic material over the conductor, axially pulling an end portion of only the insulating covering longitudinally over and beyond the end of the conductor, and heat sealing as well as fusing only the end portion of the covering together to close off the end of the conductor.

2. In a method for sealing a severed end of a conductor, the steps consisting of, engaging the conductor and an insulating cover thereon with first gripping means to hold the cover and conductor in a fixed position, providing a second gripping means engaging primarily only an end portion of the cover, drawing the end portion both axially and radially inwardly into a location beyond the severed end by moving the second gripping means, and fusing the end portion into an end closure completely integral with said cover at a location entirely radially within an outer periphery of the cover over the conductor.

3. In the method of claim 1 wherein said step of heat sealing occurs instantaneously upon completion of said axial pulling such that the end portion is completely free of messy and dip-sealing material and separate cap material as were as involving only the same material as the insulating covering.

4. A mechanism for effecting conductor end capping, comprising, base means including guide portions extending longitudinally and toward each other, a first gripping means for holding a conductor and an insulating covering tehreof in a fixed position relative to said base means; a second gripping means movable relative to the conductor in both longitudinal and radially inward directions relative to the conductor as well as relative to said guide portions, and means for transmitting pulling force to said second gripping means longitudinally relative to the conductor such that fusion for sealing occurs along an end of the covering at a location spaced axially from an end of the conductor.

References Cited in the file of this patent

UNITED STATES PATENTS 2,803,695     Woolley _____ Aug. 20, 1957

FOREIGN PATENTS 403,680     Italy _____ May 4, 1943

OTHER REFERENCES

Hamm: German application 1,052,672 printed March 12, 1959 (Kp 39a 14).